March 5, 1968

K. CLARK 3,371,780

APPARATUS FOR MECHANICALLY AND
ELECTRICALLY TESTING THE
QUALITY OF BONDED JOINTS

Filed April 25, 1966

INVENTOR
KENDALL CLARK

BY *Joseph L. Spiegel*

ATTORNEY

March 5, 1968

K. CLARK 3,371,780

APPARATUS FOR MECHANICALLY AND
ELECTRICALLY TESTING THE
QUALITY OF BONDED JOINTS

Filed April 25, 1966

K. CLARK 3,371,780

APPARATUS FOR MECHANICALLY AND
ELECTRICALLY TESTING THE
QUALITY OF BONDED JOINTS

Filed April 25, 1966

United States Patent Office 3,371,780
Patented Mar. 5, 1968

3,371,780
APPARATUS FOR MECHANICALLY AND ELECTRICALLY TESTING THE QUALITY OF BONDED JOINTS
Kendall Clark, Poughkeepsie, N.Y., assignor to International Business Machines Corporation, Armonk, N.Y., a corporation of New York
Filed Apr. 25, 1966, Ser. No. 544,993
9 Claims. (Cl. 209—73)

This invention relates to apparatus for mechanically and electrically testing the quality of bonded joints, and in particular to developing tension, shear and compressional forces in evaluating a bonded joint between first and second objects, typically a microminiature chip device attached to a printed circuit board or substrate, while simultaneously monitoring the bonded joints electrically.

Many information handling systems are based upon a plurality of "building block" circuits which are conveniently interconnected to perform any desired logic function, for example, arithmetic, data storage and the like. One approach to the fabrication of such building blocks is to microminiaturize individual active and passive devices and fasten them to a miniaturized substrate. This approach, generally referred to as hybrid circuitry, is discussed briefly in the periodical "Electronics" published by McGraw-Hill, Feb. 15, 1963, at pp. 45–60.

In microminiaturized circuits passive devices such as resistors, and active devices or "chips" such as transistors and/or diodes are secured to substrates of the order of 0.45" x 0.45" x 0.06". The chips, as one example, which are to be secured to the substrate are of the order of .028" x .028" and interconnection of these chips to the substrate is a particular problem. For a connection or bonded joint to be rated acceptable, it must have sufficient strength to withstand normal shock and vibration associated with information handling systems. Its electrical and mechanical characteristics must not deteriorate or change under extreme humidity conditions normally associated with such systems. Additionally, the interconnection must not short circuit to the semiconductor body. The bonded joint should also have a melting point sufficiently high that it will not be affected during any soldering of the substrate to a supporting card. Finally, the bonding materials should not produce a doping action in the chip device.

Various satisfactory bonding techniques, meeting all of the above requirements, are discussed in copending application entitled Bonded Joint and Method of Fabrication by S. Merrin, Ser. No. 513,412, filed Dec. 13, 1965, and assigned to the same assignee as the present invention. This application discusses bonded joints between built-up contacts on chip devices and a circuit topology or land pattern, frequently solder coated, on a substrate surface.

Despite the efficacy of the presently known bonding techniques, minute dirt particles on the built-up contacts or on the circuit topology or misalignment between the chip and substrate reduce the effectiveness of the bonded joint. Adequate testing of devices is required to insure that all modules will satisfy the criteria previously indicated, for their lifetime.

One well known prior art method of testing bonding joints is accomplished on a small sampling of modules through the use of a probe bonded by an adhesive to the top of the chip. The module is held in a fixture, the probe is pulled vertically upwards and ultimate chip bond strength is recorded. This is a destructive method of testing in that the modules actually tested are no longer usable, and is inherently inaccurate in that it is only applied to small samplings. All bonds are not tested.

Another well known prior art method is visual inspection under microscope which is extremely slow, tedious, expensive, and rarely definitive of the quality of the bonded joint. The apparatus of the present invention to be described in detail hereafter has been used to show that 90% of modules rejected using visual inspection should have been accepted, and conversely, some of the accepted modules should have been rejected.

In a copending application entitled Method of and Apparatus for Mechanically and Electrically Testing Bonded Joints of R. W. Bowers, Ser. No. 507,883, filed Nov. 15, 1965 and assigned to the same assignee as the present invention, chip-substrate bonded joints are tested by subjecting the bonded joints to an air blast while simultaneously monitoring the bonded joints electrically. Chips very weakly bound to the substrate will be blown off the substrate by the force of the high velocity, low presssure blast to which the bond is subjected. In addition, poor or intermittent connections give rise to changes in resistance when subjected to an air blast and so can be detected in an appropriate monitoring circuit.

In another copending application entitled Method of and Apparatus for Mechanically Testing the Quality of Bonded Joints of K. Clark et al., Ser. No. 507,848, filed Nov. 15, 1965 and assigned to the same assignee as the present invention, chip-substrate bonded joints are tested by directing the modules under a fan jet assembly having a plurality of downwardly extending nozzles from which a high velocity, high pressure air blast is being directed, there exists a narrow, sharply defined, fan shaped jet of air, contained within an enveloping shockwave, in which the air is at the same pressure and traveling at the same high velocity as the air at the tip of the nozzle. By closely spacing a nozzle to the bonded joints between a chip attached to the substrate, the bonded joints are subjected to a tensile stress generated by the action of the high pressure, high velocity, jet of fluid medium directed between the chip and substrate. If the pressure is kept within certain limits, chips weakly bound to the substrate, either because of a poor chip to chip contact connection or chip contact to substrate circuit pattern connection, will be blown off the substrate. Moreover, by passing the module through the jet, each bonded joint is successively subjected to tensile, shear and compressional forces.

The vast number of modules required in the manufacture of information handling systems, which is at present the primary use for this hybrid circuit technology, demands that the testing operation be performed at relatively high speeds with extreme accuracy. Moreover, a further requirement is that all modules be tested and without damage to the module in such a way that defectively bonded modules can be rapidly determined and separated from acceptable module.

A general object of the present invention is an apparatus for and method of testing the quality of bonded joints.

Another object is the application of shear, tension and compressional forces to a bonded joint between a microminiature chip and substrate while simultaneously monitoring the joint for detecting changes in resistance, resulting from the application of said forces.

Still another object is the rapid and reliable testing of bonded joints included in microcircuits.

A further object is the automatic testing of bonded joints in hybrid microcircuits.

A still further object is the simultaneous testing of the bonded joints between connection terminals attached to a chip device and to a circuit pattern formed on the surface of a substrate or printed circuit board.

Yet another object is a feeding mechanism that is capable of transferring articles smoothly from one horizontal level to another, and whose travel through one position of a path can be interrupted in response to a condition without interrupting travel through another portion.

Another object is a loading mechanism for modules having pins extending therefrom, that is provided with a jaw mechanism for positively and properly placing the modules on a perforated carrier, with the pins of the module extending through perforations in the carrier.

Still another object is a clamp assembly that is capable of maintaining precise horizontal and vertical positioning of a module while a work operation is being performed thereon.

These and other objects are accomplished in accordance with the present invention, one illustrative embodiment of which comprises apparatus for testing the bonded joints between a microminiature chip device attached to the surface of a substrate of a microminiature module including a support means such as a turntable movable in a given path, and having a plurality of module holding means mounted thereon. A plurality of work stations are arranged in sequential relation about the turntable, and means are provided for indexing the table to carry modules to each of these work stations. The work stations include: a load station where modules are placed in the module holding means on the turntable; a test station where the joints of the module are subjected to blasts of fluid medium while being monitored for detecting variations in resistance across the joints resulting from the blasts of fluid medium to thereby determine whether a given module, based on the variations in resistance noted, is acceptable or is to be rejected; an accept unload station including means for removing acceptable modules from the table; and a reject unload station including means for removing rejected modules from the table. It should be noted that at the test station means are provided for moving the blast means relative to the module to thereby successively subject the joints to tensile, shear and compressional forces.

The apparatus further includes means for storing the determination made at the test station and control means to deactuate the accept unload station when a module to be rejected, based on the determination made at the test station, reaches the accept unload station.

The module holding means includes a clamp assembly for maintaining precise horizontal and vertical positioning of a module. The clamp assembly swings into engagement at the test station where the modules are subjected to high velocity, high pressure blasts that might otherwise blow the modules off the turntable, or at least out of engagement with the resistance variation detecting means.

A feeding mechanism is also provided which includes a plurality of conveyors for presenting module bearing firing sticks to the load station, carrying the emptied stocks past the load station and on around the table, and making them available at the accept unload station for receiving tested modules found to be acceptable. The feeding mechanism is indexed in increments between intervals of rest, and means are provided to interrupt indexing past the accept unload station in response to a reject determination at the test station so that the firing stick at the accept unload station can wait until an accepted module is placed thereon. In this way, when the firing sticks leave the apparatus they are completely filled with acceptable modules.

The foregoing and other objects, features and advantages of the invention will be apparent from the following more particular description of the preferred embodiments of the invention as illustrated in the accompanying drawings, wherein:

FIGURES 11A, B, C and D are progressive top views of nozzles directing a blast from each of the cardinal directions at a module under test;

FIGURES 12A, B and C are progressive side views of a module under test from one nozzle.

Figure 1:
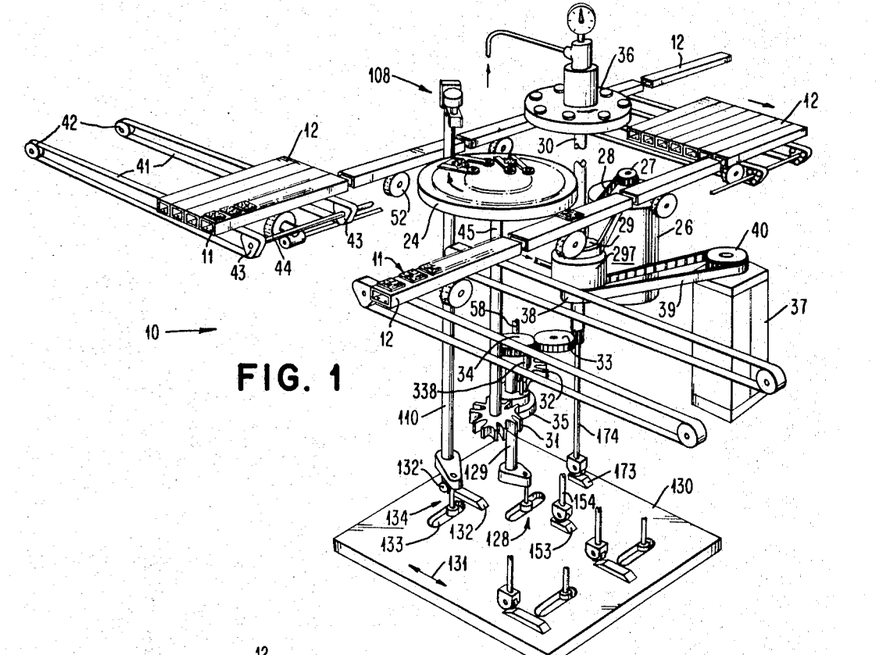
FIGURE 1 is a schematic perspective, exploded view, of the bond tester apparatus of the present invention.

Referring now to the drawings, FIGURE 1 discloses the novel bond tester apparatus 10 of the present invention, the type of modules 11 to be tested, and firing sticks 12 used for transporting untested modules to and acceptable tested modules from the bond tester apparatus.

Module

Figure 1A:
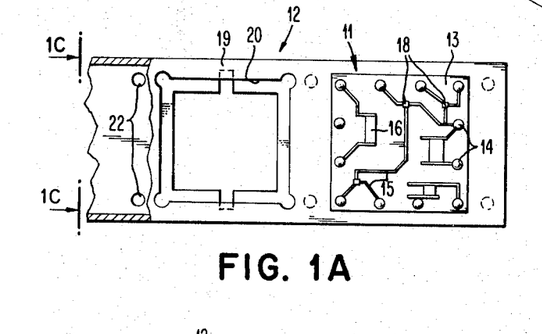
FIGURE 1A is an enlarged plan view, partially broken away, showing a microminiature module supported in a firing stick which is being driven on a sprocket wheel.
Figure 1B:
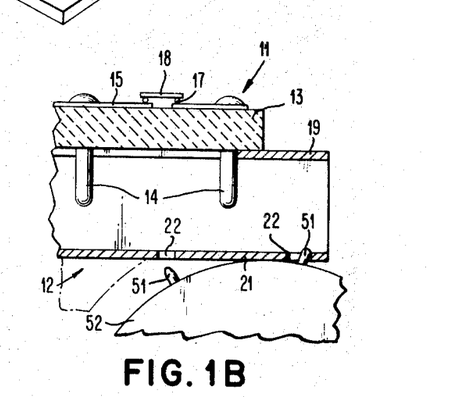
FIGURE 1B is an enlarged, sectional elevational view partially broken away, showing a microminiature module supported in a firing stick which is being driven on a sprocket wheel.
Figure 1C:
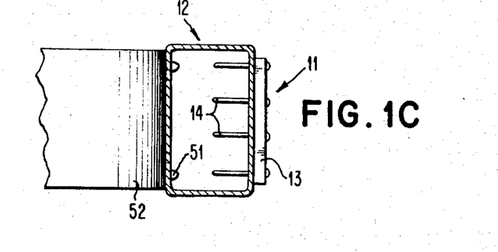
FIGURE 1C is a sectional side view taken along the lines 1C—1C of FIGURE 1A in the direction of the arrows.

Referring in particular to FIGURES 1A–1C, a microminiature functional component or module 11 is illustrated having a plurality of bonded joints to be tested by the novel method and apparatus of the present invention. It is to be understood, of course, that the invention is applicable to other types of bonded conductive connections between any two conductive elements.

Each module includes a substrate 13 having extending contact pins 14 spaced about its periphery and forming a pin cage. The substrate is a good thermal conductor and has excellent thermal properties. One material found to satisfy these criteria is a composition of 95% alumina which is pressed or otherwise formed into a suitable geometric configuration, typically a 0.45" square. A conductive pattern 15 of unique topology is printed on the substrate top surface and normally subsequently tinned with solder. The pattern may represent any particular circuit configuration and is joined to two or more contact pins to provide electrical contact from active and passive devices on the substrate to utilization apparatus (not shown). The passive devices such as resistors 12 are normally printed directly on the substrate top surface, while the raised contacts 17, typically spherical, of one or more active chip devices 18 are bonded, for example, by solder reflow technique to the pattern 15 on the substrate surface. It is the bonds between the chip device 18 and contact 17 and between the contact 17 and pattern 15 which are tested by the novel method and apparatus of the present invention.

Firing stick

Referring again to FIGURES 1A–1C, a plurality of modules 11 to be tested is supported in a unitary longitudinally extending channel or firing stick 12 of rectangular cross section. The channel top plate 19 is provided with a plurality of generally rectangular openings 20. The dimensions of openings 20 are slightly larger than those of the pin cage but less than those of the substrate 13. Modules rest pins down over each opening 20. Each stick supports ten modules. Channel bottom plate 21 is provided with a plurality of smaller, circular, longitudinally spaced openings 22 to be subsequently engaged in the bond tester apparatus 10 by the teeth of a sprocket wheel.

Bond tester general construction and operation

The bond tester 10 includes two principal conveyance systems, a firing stick feed mechanism 23 and a module carrier table 24.

The ultimate purpose of the firing stick feed mechanism 23 is transporting firing sticks 12, that is, presenting untested module bearing firing sticks to the load station of the carrier table 24 where the modules are transferred from the sticks 12 to the table 24; carrying the emptied sticks 12 past the load station and on around the module table; and making them available at the accept unload station of the carrier table for receiving tested modules found to be acceptable.

The module table 24 carries a plurality of modules 11 sequentially through a number of stations. There are six stations, two of which are idle and four of which perform specific work functions in regard to module loading, bond testing, accepted module unloading and rejected module unloading.

The table is indexed periodically after each working cycle to move each module to and through each successive work station.

Figure 2:
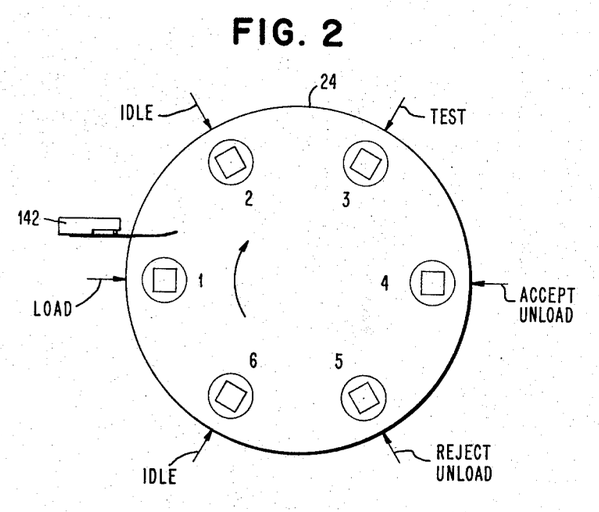
FIGURE 2 is a diagrammatic representation of the carrier table and stations embodied in the apparatus of FIGURE 1.

Before proceeding to a more detailed description of the invention, the following summary of operations performed at each work station will be given with reference to FIGURE 2.

At the first station, the load station, modules are transferred from a firing stick and placed into holding means on the table by a loading means.

The table then conveys the module two positions through an idle station to the third station, the test station, at which the bond testing operation is performed. During the bond testing operation each bonded joint will be subjected to high pressure, high velocity jets of fluid medium, while simultaneously being monitored electrically to determine whether the given module under test has any defective joints.

Following the test cycle, the table carries the module one position to the accept unload station. Assuming that all bonded joints on the module were found to be acceptable, an unloading means will remove the module from the holding means. The table is then indexed three more positions through a reject unload station and an idle station to the first station where the holding means, now empty, will receive another module and carry it through the complete cycle.

If any of the bonded joints of a given module at the test station were found to be defective, the unloading means at the accept unload station is not actuated and the given module is carried by the table one further position to the reject unload station, where an unloading means removes the module from the holding means. The table is then indexed two more positions through the idle station to the first station where the holding means, now empty, will receive another module and carry it through the complete cycle.

Drive system

Referring in particular to FIGURE 1, the primary drive system for the apparatus includes a motor 26, a cog belt pulley 27, cog belt 28, driver pulley 29, and drive shaft 30. Drive shaft 30 alternately indexes Genevas 31, 32 through idler gear 33, Geneva driver gear 34 and Geneva drive 35. Drive shaft 28 also drives an air nozzle table 36 (to be described in detail hereinafter) directly and timing mechanism 37 indirectly, through cog belt pulley 38, cog belt 39 and driver timer pulley 40. Further details of the drive system will be explained as needed with reference to the particular part of the apparatus being driven.

Feed mechanism

Figures 3, 3A:
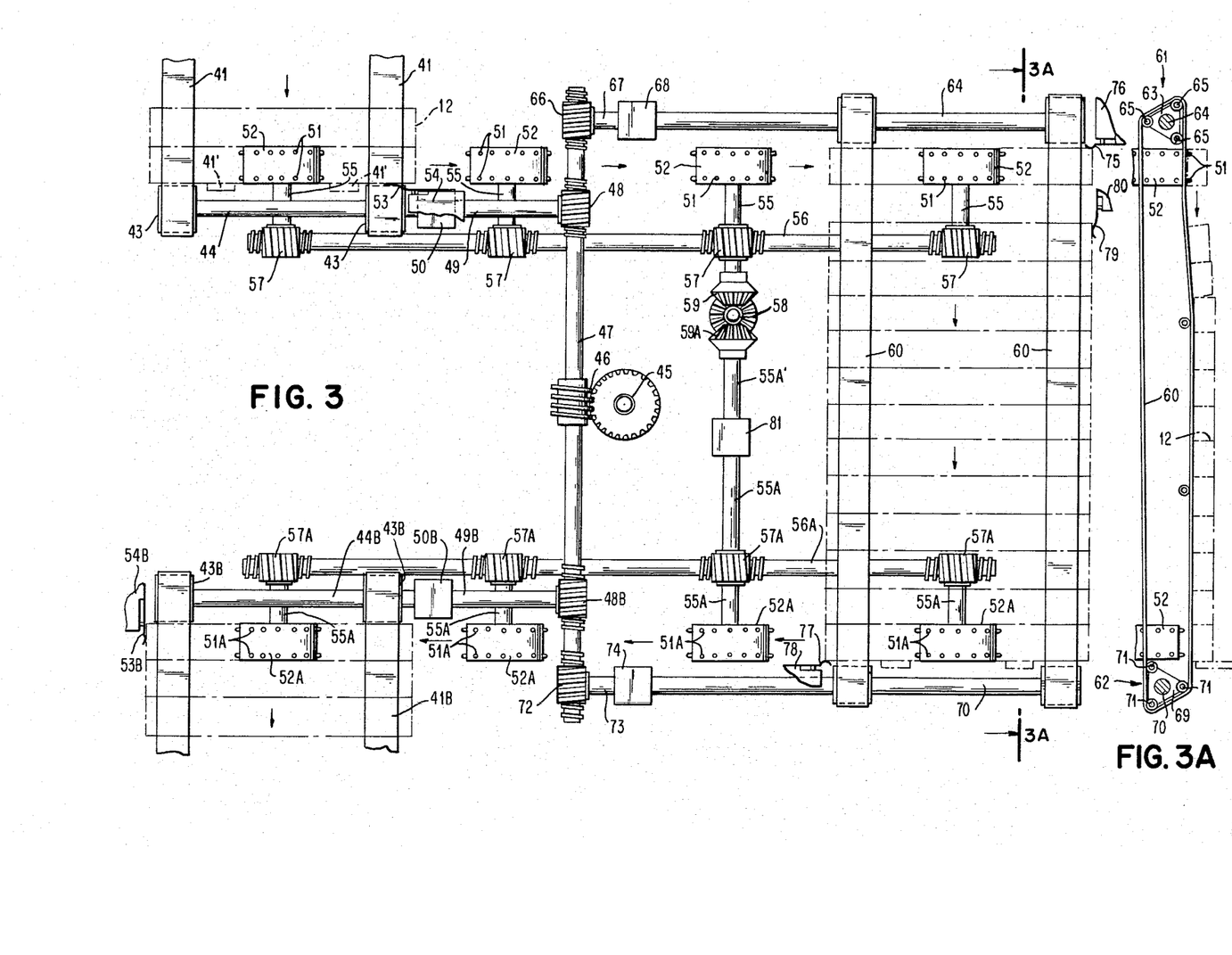
FIGURE 3 is a plan view of the drive assembly for the firing stick feed mechanism.
FIGURE 3A is a sectional view taken along lines 3A—3A of FIGURE 3 in the direction of the arrows.

Referring now to FIGURE 3, a first endless conveyor includes a pair of spaced, parallel, smooth, endless belts 41 extending around pairs of pulleys 42, 43, the pulleys 42 being circular (FIGURE 1) while the pulleys 43 are equilaterally triangular. The pulleys 43 are fixedly mounted on shaft 44. Intermittent rotational movement about a horizontal axis is transmitted to shaft 44 from the Geneva 31 via vertically extending shaft 45, spiral gear set 46, shaft 47, spiral gear set 48, shaft 49, and clutch 50, when engaged. The gear ratios, Geneva dimensions, etc., which are believed to be an exercise of mechanical skill and therefore will not be described in detail, are such that the rotational movement transmitted to the shaft 44 will cause pulleys 43 to advance the conveyor belts 41 and to carry a firing stick 12 at least with the width of the firing stick between each interval of rest.

In operation, a worker places firing sticks 12 on the conveyor. The sticks are carried forward toward the pulleys 43. At the final indexing step, the firing sticks 12 are raised by the conveyor due to the triangular shape of pulleys 43 and loaded onto the teeth 51 of a sprocket wheel 52 spaced midway between the endless belts 41. Longitudinal guide rails (not shown) assure that the sticks rest on the conveyor perpendicular to the path of motion during travel while a rear wall stop 41' assures that the sticks come to rest directly on the sprocket wheel teeth 51 at the final indexing step.

When the firing stick comes down on the teeth of sprocket wheel 51, it also deflects the lever 53 of a switch 54 which disengages solenoid actuated clutch 50 to prevent further rotational indexing of shaft 44 until the firing stick 12 clears the lever 53. The clutch 50 is then re-energized by switch 54 permitting rotational movement of shaft 44 and placement of another firing stick 12 upon the teeth 51 of sprocket wheel 52.

A second conveyor at right angles to the first includes a plurality of longitudinally spaced sprocket wheels 52 having teeth 51 which engage firing stick bottom openings 22 to drive the sticks 12 past the load station of the carrier table 24. The wheels 52 are fixedly mounted on shafts 55. Each of these shafts 55 is driven off a main shaft 56 by means of spiral gear sets 57. Intermittent rotational movement about a horizontal axis is imparted to shaft 56 from the Geneva 32 via vertically extending shaft 58, bevel gear set 59, shaft 55, and a spiral gear set 57. The drive means advances this second conveyor forwardly, the distance between the center lines of two openings 20.

A third endless conveyor at right angles to the second includes a pair of spaced, parallel, smooth endless belts 60 extending around pairs of pulleys 61, 62. Pulleys 61 include triangular shaped pieces 63 centered about and fixedly mounted to shaft 64, and having rollers 65 pivoted at each corner. Rotational movement about a horizontal axis is transmitted to shaft 64 from shaft 47 via spiral gear set 66, shaft 67 and solenoid actuated clutch 68 when energized.

Similarly, pulleys 62 include triangular shaped pieces 69 centered about and fixedly mounted to shaft 70 and having rollers 71 pivoted at each corner. Rotational movement about a horizontal axis is transmitted to shaft 70 from shaft 47 via spiral gear set 72, shaft 73, and clutch 74 when engaged.

One way drive clutches (not shown) drive rollers 65 and 71. When pulleys 62 drive belts 60, rollers 71 become locked by the one way clutches to provide driving torque to the belts, while the one way clutches of rollers 65 free wheel to permit free motion of the belt. Similarly when pulleys 61 are driving, rollers 65 become locked and rollers 71 free wheel.

In operation, solenoid actuated clutch 68 is normally disengaged while solenoid actuated clutch 74 is engaged so that belts 60 are normally indexed in the direction of the arrow by the action of pulleys 62. When a firing stick 12 is advanced in its final indexing step on the second conveyor over the belts 60, it also deflects the lever 75 of a switch 76 to engage solenoid actuated clutch 68, rotate shaft 64 and thereby lift the firing stick 12 off the second conveyor, by the action of triangular pulleys 62 and place it just beyond the sprocket wheel 52.

The stick is carried forward toward pulleys 62. At the final indexing step on the third conveyor, the firing stick is raised by the conveyor due to the action of triangular pulleys 62 and loaded onto the teeth 51a of a sprocket wheel 52a of a fourth conveyor. When the firing stick comes down on sprocket wheel 52a, it also deflects the lever 77 of a switch 78 which disengages solenoid actuated clutch 74 to prevent further indexing of shaft 70 until the firing stick clears the lever 77.

If, when a firing stick is coming off the second conveyor and depresses lever 75 to actuate the clutch 68, the third conveyor is filled with firing sticks, the lever 79 of a switch 80 connected in series with switch 76 is deflected by the immediately preceding stick to break the electrical connection to clutch 68 and prevent rotation of shaft 64. Further indexing of the second conveyor will drive the firing stick beyond the third conveyor and off the machine.

The fourth conveyor drives firing sticks past the accept unload station. The fourth conveyor is similar to the second. Parts of the fourth conveyor which are similar to parts of the second are identified by like reference numerals plus the letter a.

Intermittent rotational movement is imparted to shaft 56a from shaft 58 via bevel gear set 59a, shaft 55a', solenoid actuated clutch 81, and shaft 55a. Clutch 81 is normally engaged. However, should a reject occur at the test station, clutch 81 will be disengaged for one interval. In this way the firing stick is not indexed when no module is to be transferred by the unloader at the accept unload station to the firing stick.

A fifth conveyor removes the firing sticks from the fourth conveyor and carries them, filled with accepted modules, out of the apparatus. The fifth conveyor is similar to the first. Parts of the fifth conveyor which are similar to parts of the first conveyor are identified by like reference numerals plus the letter b.

Solenoid actuated clutch 50b is normally disengaged. When a firing stick is advanced in its final indexing step on the fourth conveyor, it also deflects the lever 53b of switch 54b to engage clutch 50b, rotate shaft 44b and thereby lift the firing stick off the fourth conveyor, by the action of triangular pulleys 43b and place it just beyond sprocket wheel 52a.

*Module carrier table*

Figures 4, 4A:
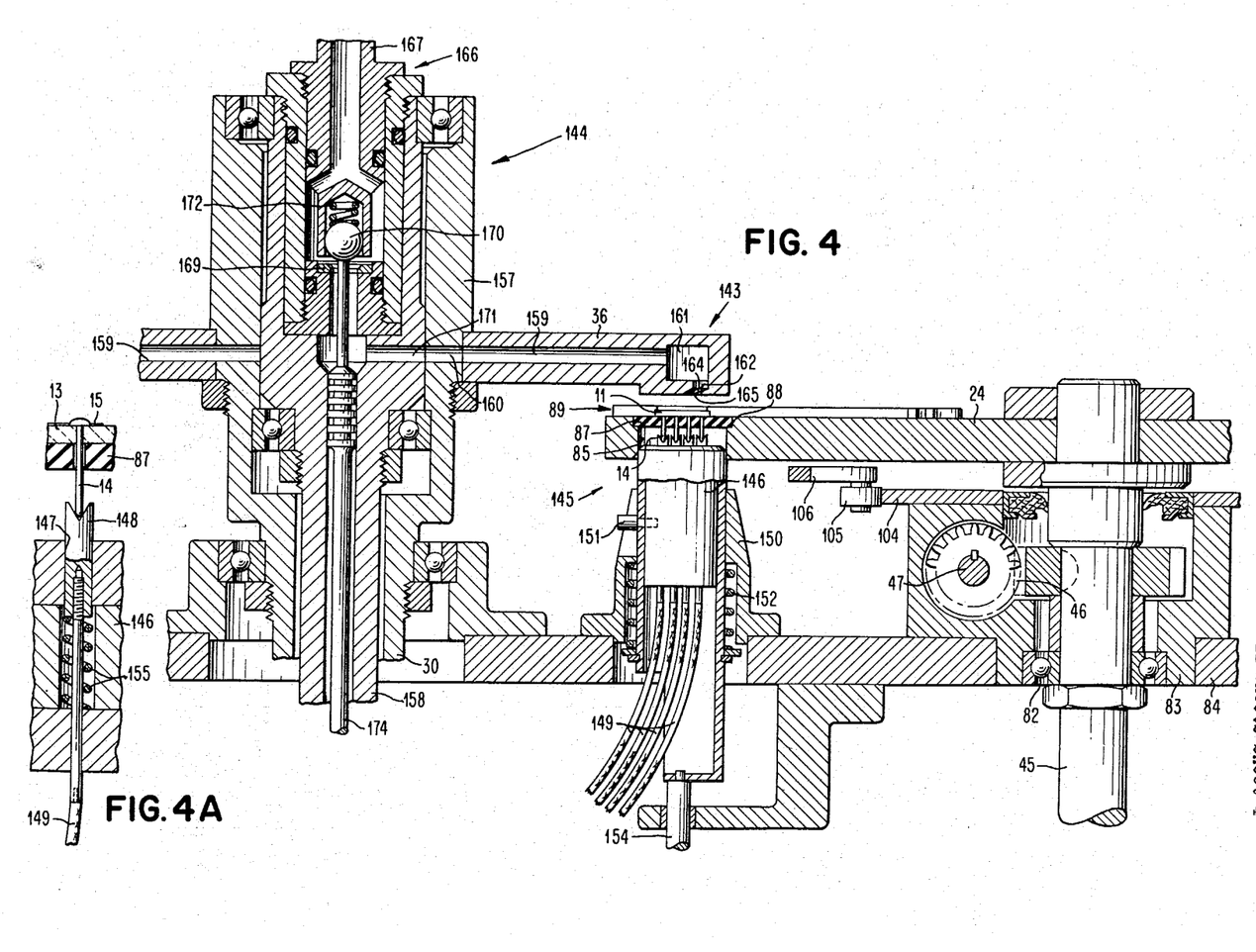
FIGURE 4 is a vertical sectional view, broken away, of the rotary air blast apparatus and contact assembly.
FIGURE 4A is an enlarged vertical sectional view, broken away, of one of the spring loaded contacts in the contact assembly.

The ultimate purpose of the table 24 is to carry the modules through a number of stations, holding them firmly at the test station, and releasing them before reaching the unload stations. Referring now to FIGURE 4, the module carrier table 24 is mounted on the rotary shaft 45. The upper end of the shaft is rotatably supported in a bearing 82 mounted in the removable cover plate and spiral gear set housing 83, which is removably secured to a stationary support member or frame 84. The table is driven intermittently due to the intermittent rotary motion of the shaft.

A plurality of openings 85 are spaced about the periphery of the table at each of which is disposed a module holding means. There are six such openings. A perforated plate 87 made of insulating material is fixedly disposed over each opening in a circumferential groove 88. The modules 11 will be placed on the table 24 in such a manner that the pins 14 extending from the module pass through the perforations in these plates.

While at the bond testing station, the modules are being subjected to high velocity, high pressure jets of fluid medium. To prevent the module from being blown off the table and to assure its proper positioning during the bond testing operation, the holding means includes a clamp assembly 89 which is adapted to swing into engagement with each module just after placement on the carrier table, firmly hold each module in place during its travel through each station, and to swing out of engagement just before reaching the accept unload station.

Figures 5, 6:
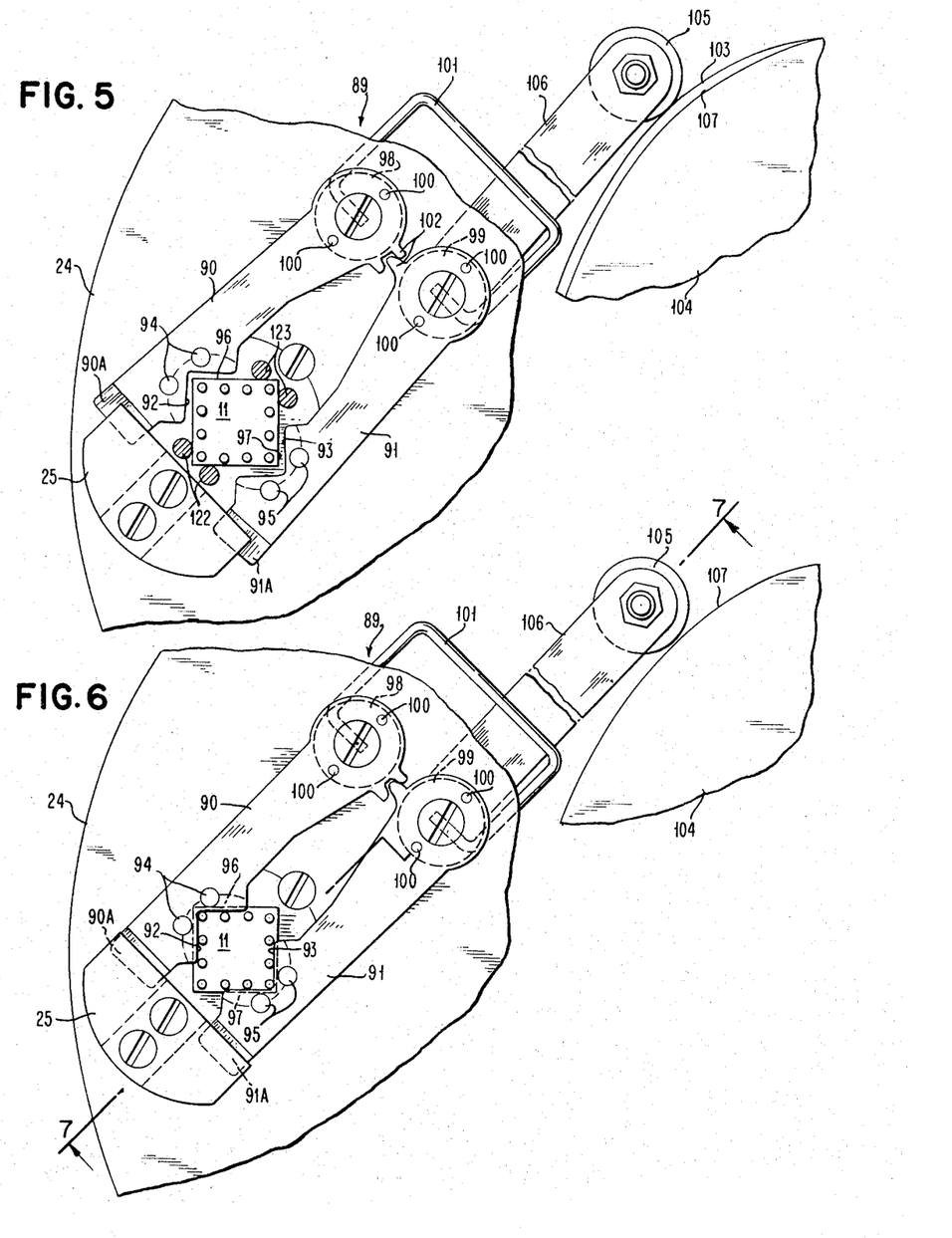
FIGURE 5 is a top view of a clamping assembly for maintaining precise horizontal and vertical positioning of a module on the carrier table, shown in the open position.
FIGURE 6 is a top view of the clamping assembly of FIGURE 5, shown in the closed view.
Figure 7:
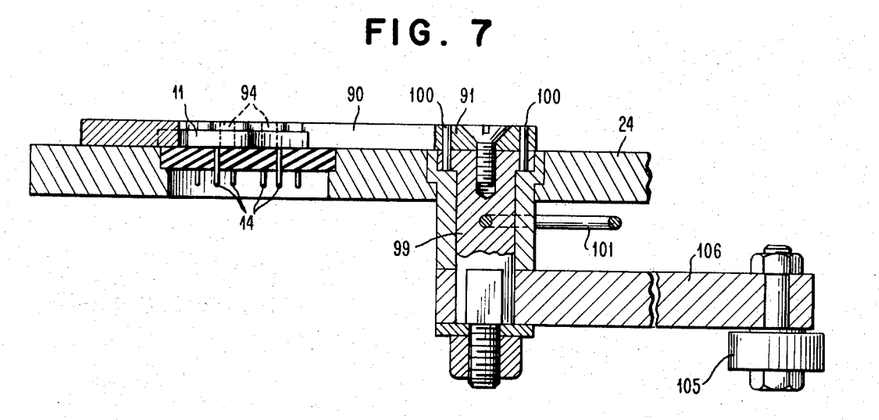
FIGURE 7 is a vertical sectional view taken along the lines 7—7 of FIGURE 6 in the direction of the arrows.

As best seen in FIGURES 5–7, the clamp assembly 89 includes lever arms 90, 91 which swing into and out of engagement with diagonally opposite corners of the module. The lever arms contain right angle cut-out portions 92, 93 with pairs of wear resistant discs 94, 95 for contacting opposite corners of the module to limit horizontal motion. Ledge portions 96, 97 and end step portions 90a, 91a, in closed position, fit over the corners of a module and under a keeper 25 secured to table 24 to vertically constrain the module and arms during testing. The arms 90, 91 are secured to rotatable shafts 98, 99 by dowel pins 100. Connecting spring 101 holds the arms in normally closed position, while meshing gear teeth members 102 transmit any angular motion of lever arm 91 to that of lever arm 90.

The lever arms are actuated from a normally closed position (FIGURE 6) to open position (FIGURE 5) when indexed from the bond test station to the accept unload station, through cam surface 103 of a stationary cam member 104, cam roller 105, and arm 106 secured to shaft 99 (FIGURE 7). The lever arms remain open thereafter until placement of a new module by insertion of its pins through the perforate plate at the load station. The table is then indexed to the next (idle) station and roller 105 advances along cam surface 103 to base circle 107 of the member 104 causing the arms to close under kthe action of the spring 101.

*Load station*

At station 1, the load station, modules are picked from the firing sticks during their dwell period and positively positioned on the carrier table during its dwell period such that the module contact pins extend through the perforations in the holding means plates. These dwell periods alternate.

Figures 8, 8A:
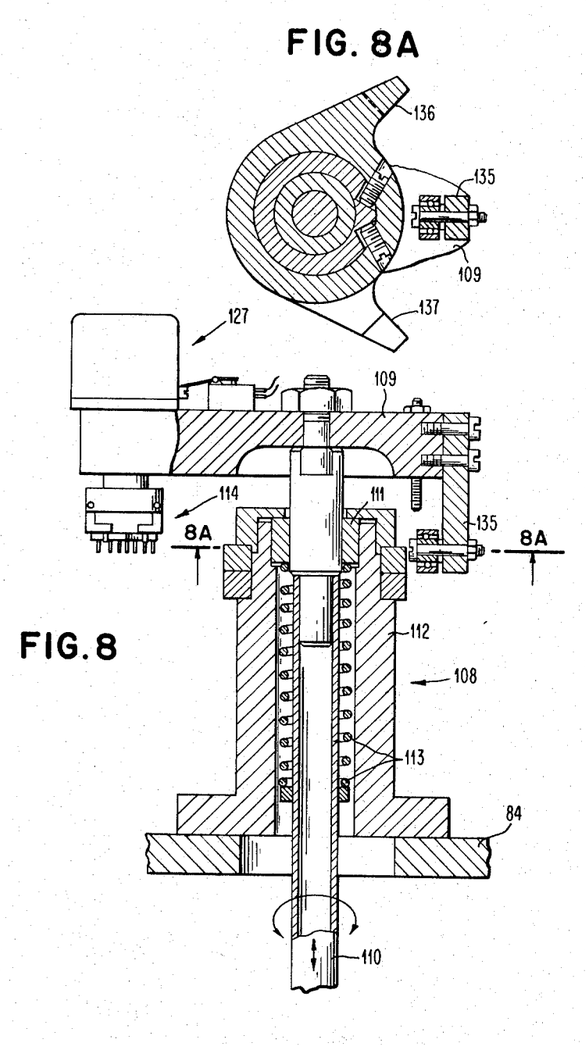
FIGURE 8 is a vertical sectional view, broken away, of the loading and unloading mechanisms.
FIGURE 8A is a horizontal sectional view taken along the lines 8A—8A of FIGURE 8 in the direction of the arrows.

Referring in particular to FIGURE 8, a loading mechanism 108 is disclosed which includes a loading arm 109 secured to a shaft 110 having an upper and lower section joined together through a spring override means (not shown). Rotation and reciprocation of the shaft 110 is permitted within the removable bushing 111 located in the support member 112 secured to the frame 84. Spring 113 normally urges the shaft 110 downwardly.

Figures 9, 9A, 9B:
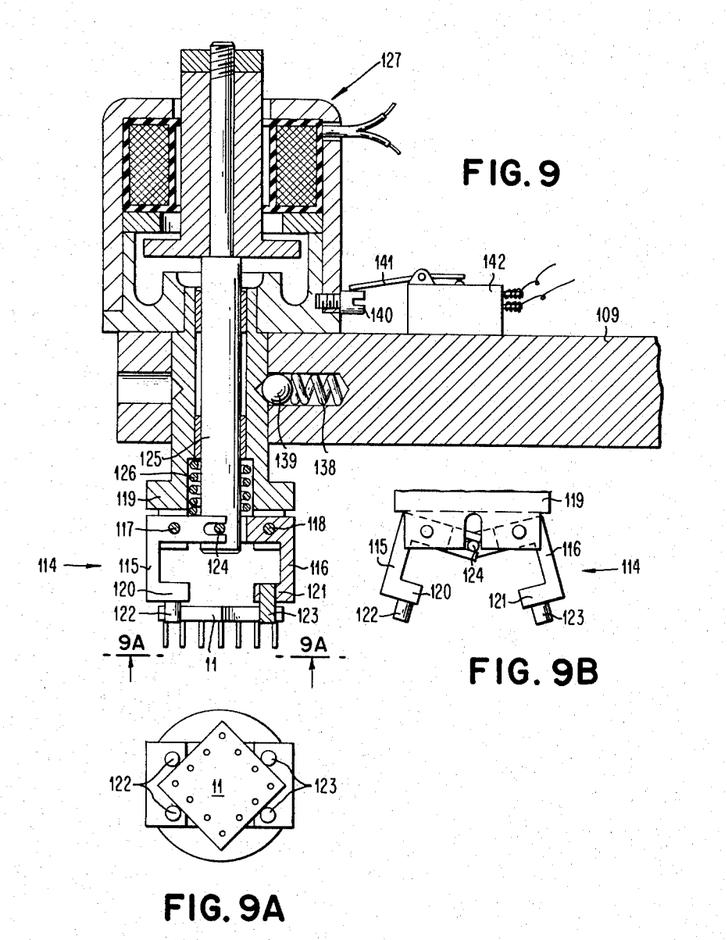
FIGURE 9 is a vertical, sectional view, broken away, of the jaw mechanism for grasping and releasing modules.
FIGURE 9A is a bottom view taken along the lines 9A—9A of FIGURE 9 in the direction of the arrows.
FIGURE 9B is a view of the arms or jaws in FIGURE 9, shown in the open position.

Extending from one side of the loading arm 109 is a jaw mechanism 114. As best seen in FIGURE 9, the mechanism 114 includes a pair of arms 115, 116 pivotable about pins 117, 118 secured through a sleeve member 119. Arms 115, 116 are provided with extensions 120, 121 at one end. Each extension is provided with pairs of wear resistant pins 122, 123 for engaging diagonally opposite corners of the module 11. The opposite ends of the arms 115, 116 are slotted for reception of and movement with a pin 124 which is permitted to reciprocate within a slot in sleeve 119. Pin 124 is secured to the lower end of a shaft 125. A spring 126 normally urges the shaft 125 downwardly to hold the arms 115, 116 in open position. Upward vertical motion of shaft 125, as by energization of solenoid 127, actuates the arms to closed position.

Actuation and operation of loading mechanism 108 is as follows. Driving scotch yoke assembly 128 (FIGURE 1), driven by shaft 129 reciprocates cam plate 130 in the direction of the arrows 131. Cam 132 and slot 133 actuate driven scotch yoke assembly 134. Yoke assembly 134 oscillates the lower portion of shaft 110 through an angle of 120°. A spring override mechanism (not shown) including extension 135 (FIGURE 8) and stops 136, 137 limits swing of the upper section of shaft 110 to the central 90° of the aforesaid 120° angle. This results in arm 109 having 90° oscillatory motion about the axis of shaft 110 during oscillatory motion of the upper portion of shaft 110 and vertical reciprocal motion during the remaining oscillatory motion of the lower portion of shaft 110. Upon reaching the limits of oscillation over the firing stick, the arm 109 is reciprocated down by cam 132 and cam follower 132′ and the solenoid 127 is energized to grasp the module. The arm is reciprocated upward by the return action of cam 132 upon reaching the limit of oscillation over the carrier table and the arm is reciprocated downward by cam 132, the solenoid 127 is de-energized to open the arms 115, 116 and place the module 11 on the table 24 with the module pins 14 extending through the perforations of plate 87.

The mechanism 114 (FIGURE 9) has a safety release comprising ball plunger 138 in detent 139. Should a jam occur the ball releases the sleeve 119 which is raised, whereupon stud 140 contacts lever 141 of switch 142 to shut down the entire apparatus.

Similar loading mechanisms are provided at the accept unload and reject unload stations, merely performing the same functions in the reverse order. Therefore, these mechanisms will not be described in detail.

*Test station*

During the bond testing operation, each bonded joint is subjected to high pressure, high velocity jets of fluid medium while simultaneously being monitored electrically to determine whether the given module under test has any defective joints.

If a given module is found to be acceptable, it will be removed from the table at the accept unload station onto a firing stick. If defective, a signal is sent from the bond testing station to the accept unload station to deacuate it so that it will not pickup the module and to the forth conveyor so that it will not index. The defective module travels past the accept unload station to be picked up at the reject unload station and disposed of in a disposal chute (not shown) while the firing stick at the accept unload station remains stationary, waiting for the next acceptable module to be placed thereon.

Referring in particular to FIGURE 4, the module 11 is held firmly in place on the carrier table 24 by the clamp assembly 89, and subjected to jets of fluid medium such as air, from the nozzles 143 of a rotary air blast apparatus 144. While being subjected to air blast action, an electrical contact assembly 145 completes a circuit between the bonds under test and the test circuit.

Contact assembly 145 includes a cylindrical shell 146 provided with a plurality of vertical channels 147 (FIGURE 4A) for retaining spring loaded contacts 148. The contacts are arranged in the same relative location as the module pins. Leads 149 extend from the test circuit through the shell 146 to each contact. Reciprocation of the shell is permitted within the housing 150 secured to frame 84. Pin 151 prevents rotary motion. A spring 152 normally urges the shell 146 downwardly. When cam table 130 is moved in the direction of arrows 131 as shown in FIGURE 1, cam surface 153 actuates push rod 154 to elevate the shell 146 and bring the contacts 148 into engagement with the respective module pins 14. Differences in module pin length are compensated for by compression of contact springs 155 (FIGURE 4A). Contacts 148 are disengaged from the module pins 14 by the spring 152 as cam 153 lowers the push rod 154 before indexing to the next station.

Referring again to FIGURE 4, rotary air blast apparatus 144 includes a circular table 36 fixedly secured to a hub 157 of hollow shaft 30 which is adapted for rotation about idler shaft 158. The table includes radial channels 159 aligned at their inner end with communicating channels 160 in the hub 157 and leading at their outer end to high velocity air nozzles 143 spaced about the table periphery.

Each nozzle 143 includes a chamber 161 communicating directly with a channel 159. A discharge slot 162 through a downwardly extending projection 163 comprises one beveled side 164 sloping toward the horizontal at an acute angle of approximately 25° with the horizontal, and a second side 165 slanted approximately 20° to the horizontal. These converging sidewalls form the discharge passage or slot 162 of high velocity nozzle 143.

An air valve 166 controls the flow of air from an air source (not shown) to the nozzles 143. The valve includes an inlet port 167 communicating through tubing 168 to the air source, valve seat 169, valve member 170 and outlet port 171 so positioned as to be aligned with respective channels 160 in the hub 157 only when the nozzle 143 with which the channel is in communication is over or closely adjacent to the module under test. Spring member 172 urges ball valve member 170 downwardly onto valve seat 169 so that normally air will not flow.

In operation, while belt member 28 (FIGURE 1) is rotating shaft 30 to rotate table 36, cam surface 173 actuates push rod 174 to elevate ball valve member 170. When one of the channels 160 is aligned with outlet port 171 air is distributed to its nozzle as it passes over the module under test.

Figure 10:
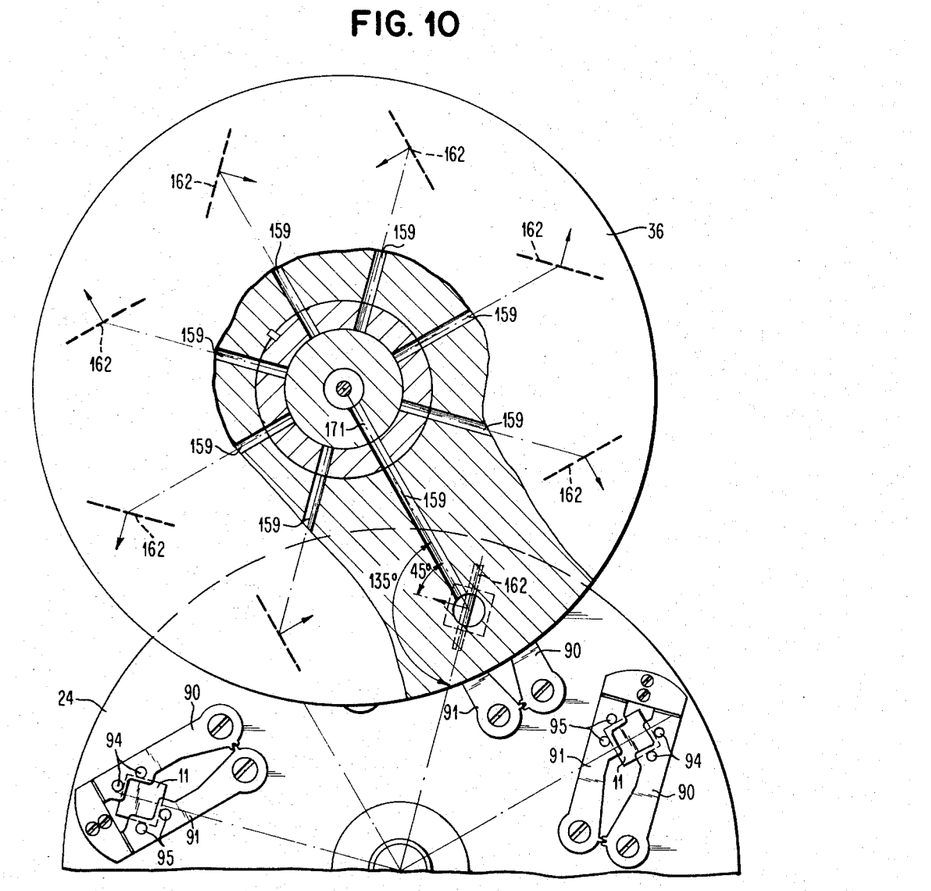
FIGURE 10 is a top view, partially in section and partially broken away of the air nozzle table and carrier table at the test station.

FIGURE 10 illustrates the positioning of the discharge slots of the air blast nozzle about the periphery of table 36. There are eight such slots, each oriented 45° with respect to a radius from the table center to the center of the slot, and two of each positioned to direct an air blast from the cardinal points.

Figures 11A, 11B, 11C, 11D:
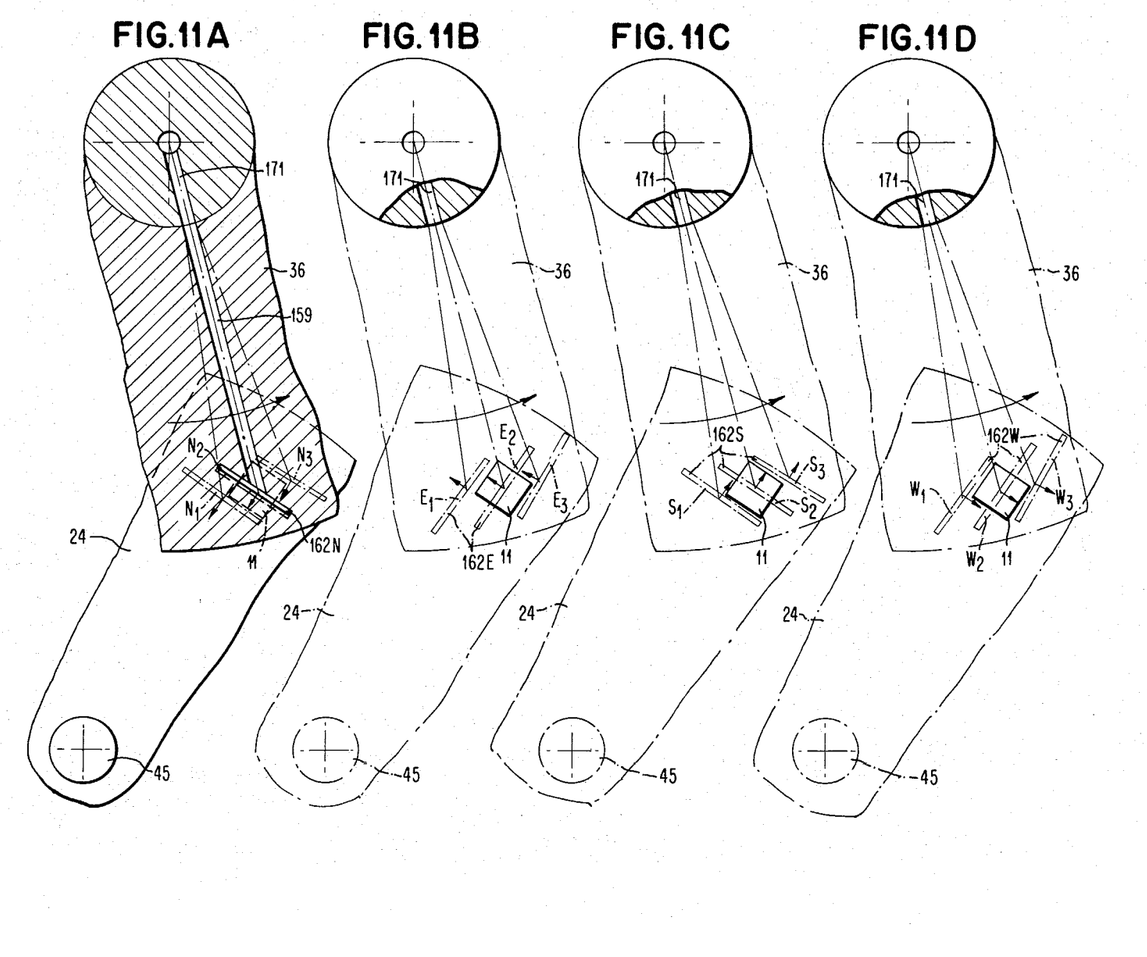

FIGURE 11 illustrates the air blast operation. Air nozzles are depicted by slots N, E, S and W. Slots $N_1$, $N_2$ and $N_3$, e.g., show progressive positions of slot N as it passes over the module during rotation of table 36. As previously shown, there are eight jet slots on the table 36, i.e. two of each N, E, S and W. Hence, a module is subjected to sequential air blasts from each of four directions twice during one revolution of table 36. Air direction is shown by a small arrow at the center of each slot. Although table 36 is rotating at approximately 200–300 r.p.m., the velocity of the slots is small compared to that of the air jet, which is supersonic. Therefore, the air vectors in relation to the modules are essentially as shown. The jet slots clear the chips on the modules by about .040″. Air is supplied to the nozzles only while each nozzle is adjacent to, or directly over, the module being tested. It should be noted that the air slots are positioned on table 24 so that their axes are rotated 45° with respect to the radius from the table center to the center of each slot, while a module is positioned on table 24 with two sides parallel to the radius passing through the module center. Further, the two radii of tables 24 and 36 intersect the module center at the air blast position, at an angle of 135° as shown in FIGURE 10.

Figures 12A, 12B, 12C:
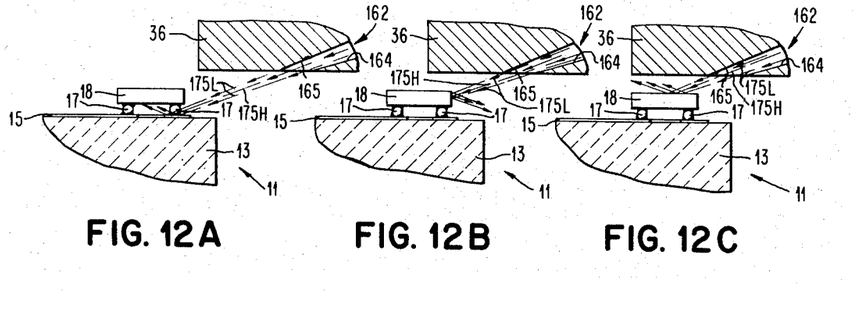

FIGURE 12 shows progressive views of a module under test. As each nozzle slot 162 passes over a module 11, a narrow, sharply defined, fan shaped jet of air 175h contained within an enveloping shockwave 175l extends a short distance from the tip of the nozzle from which the high velocity, high pressure blast is being directed. The nozzle is closely spaced to the surface of substrate 13 and directs its blast of air at an acute angle to the plane of the surface of substrate 13, typically 22½°. The air jet 175h strikes each module 11 at many times the speed of sound in free air and with a force of 300–500 pounds per square inch. In FIGURE 12A, the jet strikes the surface of substrate 13 and reflects therefrom to strike the base of chip device 18 with nearly the same force, thereby subjecting the bonded joints to tensile stress generated by the action of the high pressure, high velocity air jet directed between the chip and the substrate.

The nozzle is then advanced to a position (FIGURE 12B) at which the jet strikes the side of the chip device. Finally, the nozzle is further advanced to a position (FIGURE 12C) at which the jet strikes the top of the chip device. Thus, each bonded joint has successively been subjected to tensile (FIGURE 12A), shear (FIGURE 12B), and compressional (FIGURE 12C) forces by the one nozzle.

*Electrical circuitry*

Figure 13:
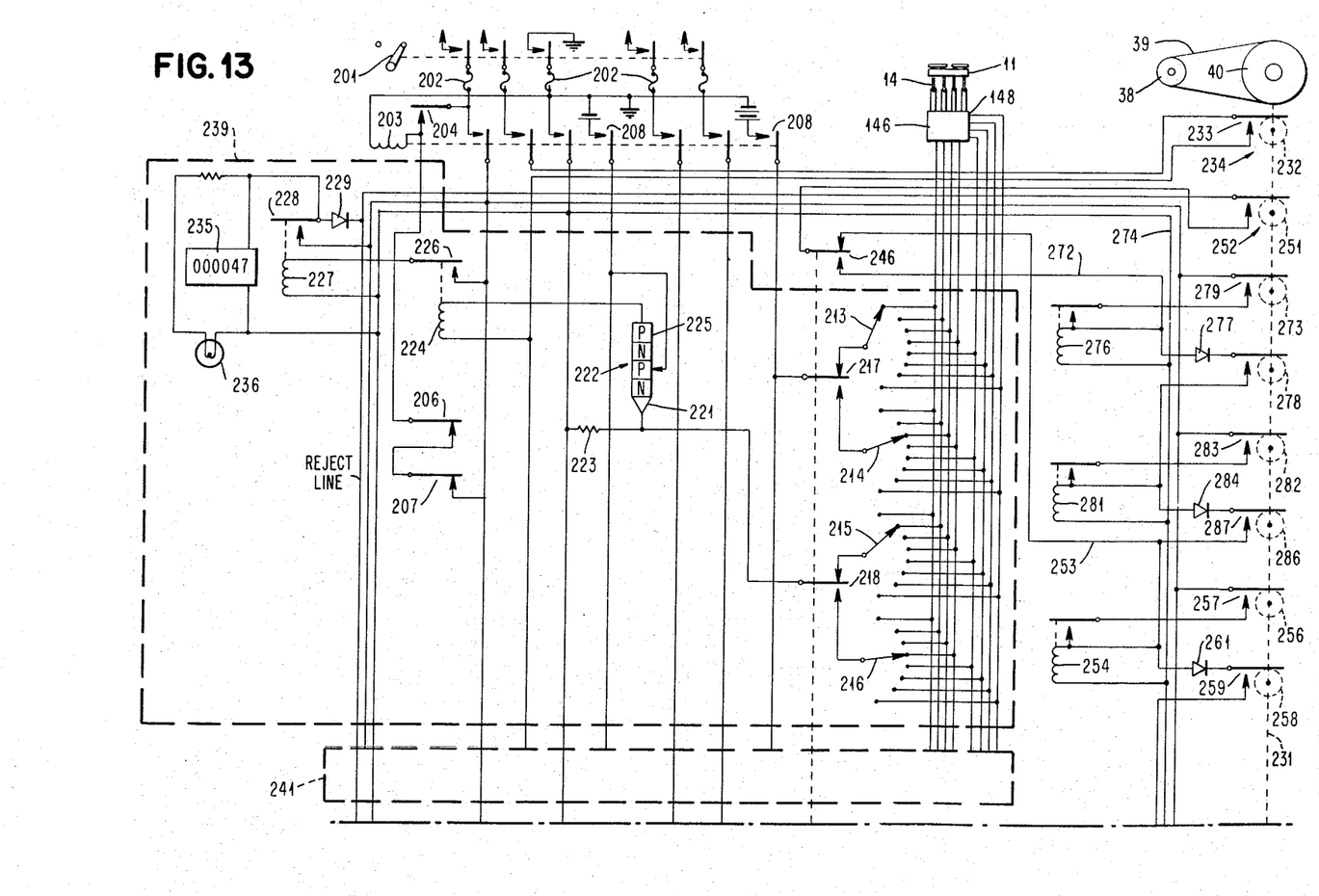
FIGURES 13 and 14 are electrical circuit diagrams showing the electrical control system for the subject apparatus.

Referring now to FIGURE 13, electrical power of various voltages enters the machine through multiple line switch 201 which is manually operated. The line switch manually opens or closes a +48 v. DC line, a +10 v. DC line, a zero voltage or ground line, and the AC power lines. Fuses 202 are in series with all lines.

The machine is activated by a remote start and emergency stop relay 203. The relay 203 is energized by a manual push button "power on" switch 204 which electrically latches the relay in its closed position.

In the event of an emergency, the machine operator pushes one of the emergency stop switches 206 or 207 to interrupt the latching circuit to the relay coil 203. When activated, the armature of the relay 203 energizes contacts in series with the power lines previously mentioned as well as the +1.3 voltage source and the +2.8 voltage source. The contacts of relay 203 are designated by the reference numeral 208. When the remote control start relay 203 is energized, power then enters the complete electrical network of the apparatus.

The pins 14 of module 11 being tested under the air blast are contacted by electrical contacts 148 retained in shell 146. Only eight of the twelve wires connected to the socket are shown for illustrative purposes. In view of the numerous circuit configurations of the various modules to be tested, it is important that various circuit combinations within a given module can be selected for testing. To provide circuit selection flexibility, twelve-point circuit selection switches 213, 214, 215, 216 are arranged to connect any of the circuits of the contacts 148. Hence, any circuit may be established to the pins 14 of the module 11, as for example, between switch 213 and switch 215. Additionally, two sequential tests can be made on the same module, when required because of common connections within the module that do not permit concurrent parallel testing of the circuits. Hereinafter, the mode of operation involving sequential testing is referred to as "two cycle operation". To this end, relay switches 217 and 218 are provided whereby various pairs of circuits may be selected sequentially for two cycle operation.

By means of circuit selection switches 213–218, a +2.8 v. potential can be applied to the emitter 221 of a thyratron type transistor 222. In the event a circuit is open in the module 11 being tested, or alternately a circuit is opened intermittently under the influence of the air blast, the 2.8 v. potential is disconnected from the emitter 221 of transistor 222 and its emitter potential falls to zero voltage through resistance 223. The action of this portion of the circuit is essentially similar to that disclosed in the Bowers' application referred to above, and therefore need not be further described here.

A sensitive mercury type relay 224 is connected between the collector 225 of transistor 222 and to the +10 v. DC source previously described. Contacts 226 of the sensitive mercury relay 224 provide power from the +48 v. DC line to coil 227 of a power relay to energize contacts 228, also operating from the +48 v. DC line. The power relay provides reject signals to a "reject" signal line through diode 229. In operation, once the transistor 222 is triggered, it remains conductive through its collector circuit until the collector circuit is interrupted to restore its normal non-conductive condition. Hence, mercury relay 224 and power relay 227 will remain energized until the power to the collector 225 of the transistor 222 is interrupted by the contacts and cams of the circuit breaker operating on circuit breaker drive shaft 231. Specifically, cam 232 and contacts 233 of the circuit breaker 234 interrupt the +10 v. DC current source to the collector 225 of the transistor 222 once per each cycle of revolution of shaft 231 to restore the transistor collector circuit to its normal nonconductive operation. To avoid spurious reject signals from apparatus cyclic functions, contacts 233 are closed after contacts 148 engage the pins 14 of module 11. Similarly, contacts 233 are opened after the air blast stops and before contacts 148 are disengaged from the pins 14 of module 11.

For statistical process control purposes, each time a circuit failure is detected by the transistor 222 the failure of the circuit is recorded on an individual solenoid actuated counter 235 and is also indicated by a flashing red light 236.

The functional operations and electrical components described in part from selector switch 213 to the reject line (excepting circuit breaker shaft 231, cam 232, contacts 233, and circuit breaker 234) are illustrated as being included within the heavy line rectangle 239. In addition to the items shown in rectangle 239, there are eleven duplicates of the equipment described, which are shown for simplification purposes as being within the heavy line 241. Hence, using various combinations of the equipment within heavy lines 239 and 241, the chip bond tester 10 has an ability to select and test up to twelve individual circuits between any of the contacts 148 of the contact holder 146 and the pins 14 of the module 11 in a single cycle operation. Additionally, a second pass or two-cycle operation for testing twelve more circuits may be programmed by manual preselection of the desired cycle from within selection switch 242. The reject line passes reject signals from all of the test circuits within rectangles 239 and 241 to a totalizing reject counter 243 and a red light 244 will flash for any reject on the complete module 11.

The normal position for the manual selector cycle switch 242 is for single cycle operation, and in the single cycle position the two cycle relay coil 245 is de-energized.

Referring now to the mechanical operation of the apparatus, and the use of the reject signal on the reject line, it will be seen from the construction of the apparatus that during the period that a module 11 is being tested at the test station on table 24, another module is concurrently either being accepted or rejected at the accept unload station. The test station and the accept/unload station are separated by a progressive index of 60° corresponding to one revolution cycle of circuit breaker shaft 231. During each cycle the loading arms 109 at the accept/unload station swings through their 90° arc and vertical reciprocation. Selection between accepting and rejecting a module is made by closing or not closing the arms 115, 116 of the jaw mechanism at the accept unload station. If the arms 115, 116 are closed on the module 11, the module 11 is picked up from the table 24 and placed into a firing stick 12. If it is rejected, the pickup arm comes down over the module 11 but the arms do not close, hence leaving the module 11 on table 24 for a subsequent 60° index to the reject/unload station continuously goes through its 90° of arc and vertical reciprocation with its pickup arms 115, 116 of functioning at each cycle. Hence, if a rejected module 11 is left on the table 24 it will be picked up by the arm 109 when the jaws 115, 116 close. If there is no module on the table 24 at the reject/unload station the jaws 115, 116 will close, but nothing is picked up.

As mentioned previously, the angle of arc on the index table 24 between the test station and the accept/unload station is 60° which corresponds to one complete rotation of the 360° for the drive shaft 231. If two cycle operation is required for two sequential tests, the module 11 remains at the test station but the drive shaft 231 goes through two cycles, or 720°.

A relay memory circuit for single cycle operation is provided to give a 360° delay of the reject signal relative to the timer shaft 231 or a 60° delay relative to the table 24 to provide for the acceptance or rejection of the module 11 at the accept unload station on the table 24 when the module 11 is subsequently indexed to the accept unload station.

Likewise, for a two cycle operation, a 720° delay of the reject signal is provided for the 60° index of the table 24. The selection between the 360° delay and the 720° delay is accomplished by relay selector switch 246 which is controlled by the two cycle relay coil 245 and the manually preset selector switch 242. Since the timing of the reject signals on the reject line is a random time function during testing and the timing of the machine must be controlled precisely, time limiting switch contacts 252 and cam 251 on the shaft 231 are provided to keep signal events properly synchronized. Timing limit switch cam 251 and contacts 252 are arranged to sample the reject signal a short period before the contacts 148 are removed from the module 11. After sampling of the reject signal by contacts 252 the reject signal is passed to relay selector switch 246 for either a 360° delay or 720° delay corresponding to single or two cycle operation, as previously mentioned. With contacts 246, 217, 218 and 245 in the position shown, a 360° delay is called for and the reject signal is passed to line 253 to energize electrical hold relay 254. At this moment, cam 256 has closed contacts 257 and holds them closed for 210°, hence energizing the electrical latch circuit of relay 254. Relay 254 remains electrically latched even though cam 251 and contacts 252 subsequently open its original energizing circuit. Shortly before cam 256 is about to open contacts 257, cam 258 closes contacts 259 and current from the energizing circuit of relay 254 is passed through diode 261 to energize relay 262. Cam 263 has just previously closed contacts 264, hence providing current for the electrical latching of relay 262. Transfer contacts 259 open shortly after relay 262 is electrically latched. Cam 263 holds contacts 264 closed during 180° plus the normal cycle time required by swinging and reciprocating arm 109 to pickup and accept a module. If a reject signal has been passed down by the 360° delay circuits described above, contacts 266 of relay 262 break the electrical circuit to solenoid coil 127a that normally closes the pickup arms 115, 116 of the arm 109 at the accept unload station. Hence, without the arms 115, 116 being closed, the module 11 is not picked up as arm 109 reciprocates upward and swings out of position.

A subsequent 60° index of table 24 moves rejected module 11 to the reject station. Cam 268 and contacts 269 control the closing of the solenoid 127 that actuates the pickup arms 115, 116 of arm 109 at the reject unload station. Solenoid coil 127 at the reject unload station always actuates the reject pickup arms 115, 116 as previously mentioned.

If no reject signal has been passed to the reject line, no reject signal is passed to the delay relays 254 and 262 and circuit 266 remains closed. Hence, solenoid 127 under the control of cams 268 and 269 will pickup and accept a module 11 from the index table 24 and release it into the firing stick 12.

If two cycle operation is required, manual selector switch 242 is moved to the two cycle position and relay coil 245 is energized moving the contacts 246, 217, 218 to the lower position. In the lower position contacts 246 energize the 720° delay line 272. Cam 273, contacts 274 and electrical latching relay 276 provide a delay of 210° which is passed to the transfer contact cam 278, contact 279 through diode 277. This in turn activates electrical latching relay 281 through cam 282 and contact 283. The delay signal on relay 281 is passed through transfer diode 284, cam 286 and contacts 287 to the 360° delay line 253. Action thereafter is the same as previously described for the 360° delay, giving a total of 720° delay plus the normal cycle time required by swinging and reciprocating arm 109 to pick up and accept a module.

To start the apparatus, the momentary contact switch 204 is closed by the operator. Relay coil 203 is electrically latched and relay contacts 208 supply power to start motor 26 and open the AC line solenoid 292 of an air valve (not shown) connected between the air source and apparatus. With modules to be tested held in firing sticks 12 on the feeding mechanism, cyclic test operation of the apparatus is initiated by the operator closing momentary contact switch 293 which electrically latches relay 294. Relay 294 closes the power circuit to open the DC solenoid 296 of another air valve (not shown) connected in series with the first air valve. As soon as solenoid air valve 296 is open, air pressure is supplied to the inlet port 167 and to the underside of air clutch 297 on the main drive shaft 28 through conduit 298. The air clutch 297 engages the rotational drive power nozzle table 36, the mechanical drives of the apparatus and the belt drive 38 to the circuit breaker cam shaft 231. All of the mechanisms will continue to run until either the apparatus is shut down by emergency stop switches 206 and 207 or the jamming of a module opens one of the switches 142 (FIGURE 9). The opening of a switch 142 immediately de-energizes the air valve coil 296 to shut off the air pressure thereby de-energizing the clutch 297, and the air stops flowing to the air nozzle table 36.

Modules 11 on firing sticks 12 to be tested are advanced by the belts 41 of the first conveyor until a firing stick 12 is positioned over the sprocket wheel 52. At that time the positioning of the firing stick 12 on the sprocket wheel 52 opens switch 54 and de-energizes solenoid 304 of clutch 50 to stop drive. Cycle timing of power for the solenoid 304 of clutch 50 is controlled by cam 301 and contacts 302. The sprockets 51 now advance the firing sticks to the table load position at which point pickup arms 115, 116 on swinging arm 109 are energized by solenoid 127 and the module is picked up and deposited on the index table 24. The timing of the pickup arms 115, 116 is controlled by cam 307 and contacts 308. The empty firing sticks 12 are moved by the sprockets 51 to the rear of the machince and are transferred or rejected from the apparatus depending on the number of firing sticks 12 on the belts 60 as determined by full-up firing stick switch 80. Switch 76 which controls the solenoid 312 of clutch 68 controls transferral of the firing sticks 12 from the second to the third conveyor. In a similar manner, switch 78 and solenoid 134 of clutch 74 control the loading of the empty firing sticks from the third conveyor onto the fourth conveyor. After the firing sticks have been loaded onto the fourth conveyor, the sprocketwheels 52a index the firing sticks under the swinging pickup arm 109 and accepted modules are loaded onto the firing sticks. The sprockets 51a index the loaded firing sticks towards the front of the apparatus where switch 54b and solenoid 317 of clutch 50b control the unloading of the filled firing sticks from the sprocket wheels 52a to the belts 41b which transfer the filled firing sticks out of the apparatus.

As filled firing sticks 12 are moved toward the operator on the right-hand side of the apparatus, a switch 321 contacts each module as it passes. Each contact closing of the switch energizes the total accepts counter 322 and total accepts light 323.

It is required that there be no empty places on the firing sticks containing the accepted tested modules. Hence, if a module is rejected, the firing stick must be immobilized until the next accepted module is offloaded from the index table 24 by the swing arm 109 at the accept unload station. To this end, the reject signal must also inhibit the drive of the firing sticks. This is accomplished by relay 262 opening contacts 326 which inhibit the drive of the solenoid 327 of clutch 81 and stop the movement of the sprockets indexing the firing sticks. Cam 328 and contacts 329 control the cyclic timing of the index drive solenoid 327 of clutch 81. In a similar manner relay contacts 345 of relay 245 inhibit all firing drives as well as the action of all solenoid actuated pickup arms during the first cycle of a two cycle testing operation.

Figure 14:
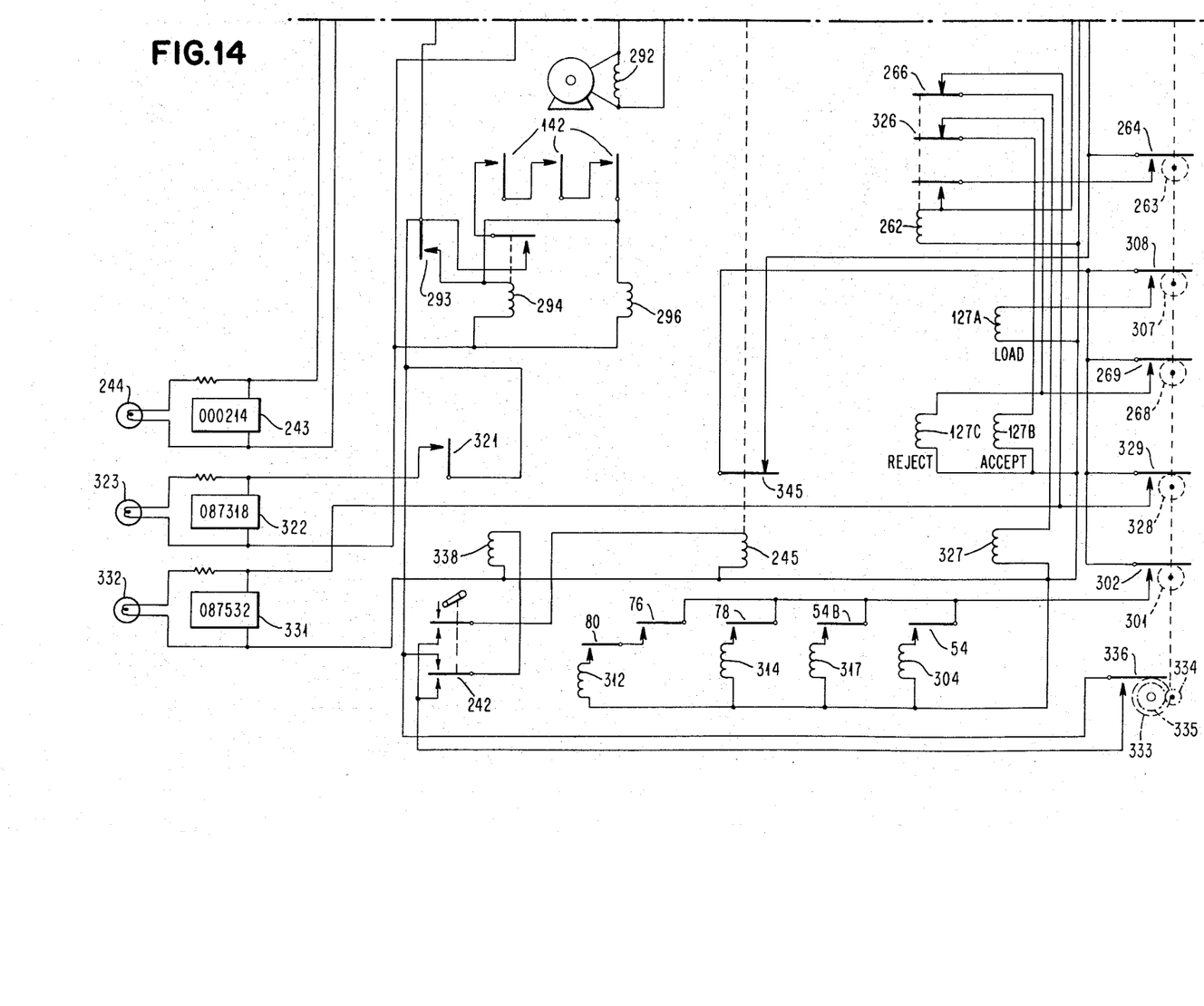

Additional apparatus control circuits are now described with reference to FIGURE 14. In high production manufacturing, it is convenient to know the total number of cycles that a machine has been operated per day, and for this purpose any cam that opens and closes contacts once every machine cycle of 360° may be used. For this purpose, cam 328 and contacts 329 feed a total machine cycle counter 331 and flash amber lamp 332.

For two cycle operation it is required to inhibit some of the functions of the machine for one half of 720°, or 360°. This is accomplished by cam 333 and contacts 336 wherein cam 333 is arranged to rotate at ½ the normal cam shaft speed of cam shaft 231 by gear reduction gears 334 and 335 in ½ to 1 ratio. In two cycle operation, contacts 336 are first closed for 180° and subsequently opened for 180° in ½ speed synchronism with cam shaft 231. However, since they are operating at ½ speed, they would be closed for 360° of the rotation of cam shaft 231 and open for a subsequent 360° of cam shaft 231. When the cycle selector switch 242 is manually put in the lower position, the electrical control system causes the solenoid 338 of a two cycle clutch to be first disengaged for 360° and subsequently to be engaged for an alternate 360° in repetitive cycles. Similarly, the contacts of relay 245 that are in series with circuit breaker contacts 329 are opened for 360° and then closed for 360°. This substracts the extra cycle of operation from the total machine cycle counter 331. The relay coil 245 also push-pulls relay selector switch 246 first to connect the reject signal line from circuit breaker contacts 252 to the 720° delay line for 360° and then to the 360° delay line for 360°, thereby providing the proper delay action for reject signals, as previously described.

It should be noted that solenoid actuated clutch 338 is concentric with shaft 129. When actuated, clutch 338 interrupts the drive to Geneva index member 35 while permitting shaft 129 to continue its drive to scotch yoke member 128 and reciprocating cam plate 130. Hence cam 173 on cam plate 130 and push rod 175 continue to actuate air valve 169, 170 controlling the duration of air flow to nozzles 143 for both cycles of a two cycle test.

The above described mechanism permits manual preprogramming of test functions for various types of modules. After preprogramming the machine may be put into automatic cyclic operation and is capable of testing modules at a rate between one and two modules per second.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. Apparatus for testing the joint bonding microminiature chip device to the surface of a substrate of a microminiature module comprising:
    means for supporting said module;
    means for subjecting the joint of a module in said support means to a blast of fluid medium; and
    means for moving said blast means relative to the module to successively subject the joint to tensile, shear and compressional forces.

2. Apparatus according to claim 1 including means for detecting variations in resistance across the joint resulting from the blast of fluid medium.

3. Apparatus according to claim 2 wherein said resistance detecting means includes means for passing a current through the joint and means for detecting variations in potential across the joint.

4. Apparatus according to claim 1 wherein said blast means includes a manifold table extending over said module support means, said table being provided with a plurality of nozzles spaced about its periphery, each nozzle being provided with a discharge slot, said slots being oriented with respect to radii from the center of said table to the center of said slots such that a blast of fluid medium is directed from different quadrants towards the joint of a module in said support means, said joint being successively subjected to each of said blasts upon rotation of said table.

5. Apparatus according to claim 4 including: a fluid medium valve, comprising, an inlet port adapted for connection to a fluid medium source, a valve seat, a valve member normally resting on said valve seat in closed position, and an outlet port; said manifold table being adapted for rotation about said valve and including channels extending inwardly from said nozzles for sequential communiction with said outlet port; means for rotating said table about said valve; and means for actuating said valve member to open position during rotation of said valve member.

6. Apparatus for testing the joints bonding a microminiature chip device to the surface of a substrate of a microminiature module comprising:
    a support means movable in a given path;
    module holding means mounted on said support means;
    a plurality of work stations arranged in sequential relation along the path;
    means for moving said support means in increments along the path between intervals of rest to carry modules to each of said work stations;
    said work stations including,
        a load station including means for placing modules in said module holding means on said support means,
        a test station including means for subjecting the joints of a module to blasts of fluid medium and means for detecting variations in resistance across the joints resulting from the blasts of fluid medium to thereby determine whether a given module, based on the variations in resistance noted, is acceptable or to be rejected,
        an accept unload station including means for removing modules from said module holding means on said support means, and
        a reject unload station including means for removing modules from said module holding means on said support means;
    means for storing the determination made at said test station until the module reaches and unload stations; and
    control means to deactuate said accept unload station, when a module to be rejected, based on the determination made at said test station, reaches said accept unload station.

7. Apparatus according to claim 6 wherein said module holding means includes a clamp assembly adapted to swing into and out of engagement with said module, said clamp assembly including ledge portions to vertically constrain said module when engaged by said clamp assembly and means operatively connected to said clamp assembly for swinging said clamp assembly into engagement at said test station.

8. Apparatus according to claim 6 including a feeding mechanism comprising a firing stick for supporting a plurality of modules, a conveyor system including a first conveyor for carrying said firing sticks to the proximate vicinity of said load station and a second conveyor for carrying the firing sticks to the proximate vicinity of said accept unload station, said load station being provided with means for removing modules from said firing stick when in said load station proximate vicinity for subsequent placement in said module holding means, said accept unload station being provided with means for placing said modules in said firing sticks in said accept unload proximate vicinity after removal from said module holding means, means for moving said conveyor system in increments between intervals of rest, the conveyor moving means intervals of rest alternating with the support moving means intervals of rest, and means to deactuate said second conveyor for one increment in response to a reject determination at said test station.

9. A clamp assembly especially adapted for maintaining precise horizontal and vertical positioning of a parallel-sided module with respect to a support member while a work operation is being performed on its surface comprising:

a pair of lever arms adapted to swing into and out of engagement with diagonally opposite corners of the module;

means associated with each of said lever arms for contacting the diagnoally opposite corners of the module thereby orienting the center point of the diagonal line passing through the diagonally opposite corners of the module with the center point between said module corner contacting means of each of said lever arms when said pair of lever arms are in engagement with the module;

means associated with each of said lever arms for contacting the surface of the module when said pair of lever arms are in engagement with the module, thereby vertically constraining the module while a work operation is being performed thereon; and means operatively connected to said pair of lever arms for simultaneously swinging each of said lever arms an equal distance into and out of engagement with the diagonally opposite corners of the module.

References Cited
UNITED STATES PATENTS

| | | | |
|---|---|---|---|
| 3,075,651 | 1/1963 | Kaden | 214—1 |
| 3,091,960 | 6/1963 | Houda | 73—103 X |
| 3,148,530 | 9/1964 | Woods | 73—12 |

ALLEN N. KNOWLES, *Primary Examiner.*